(No Model.)
W. LEE.
NIPPLE HOLDER.
No. 573,013. Patented Dec. 15, 1896.
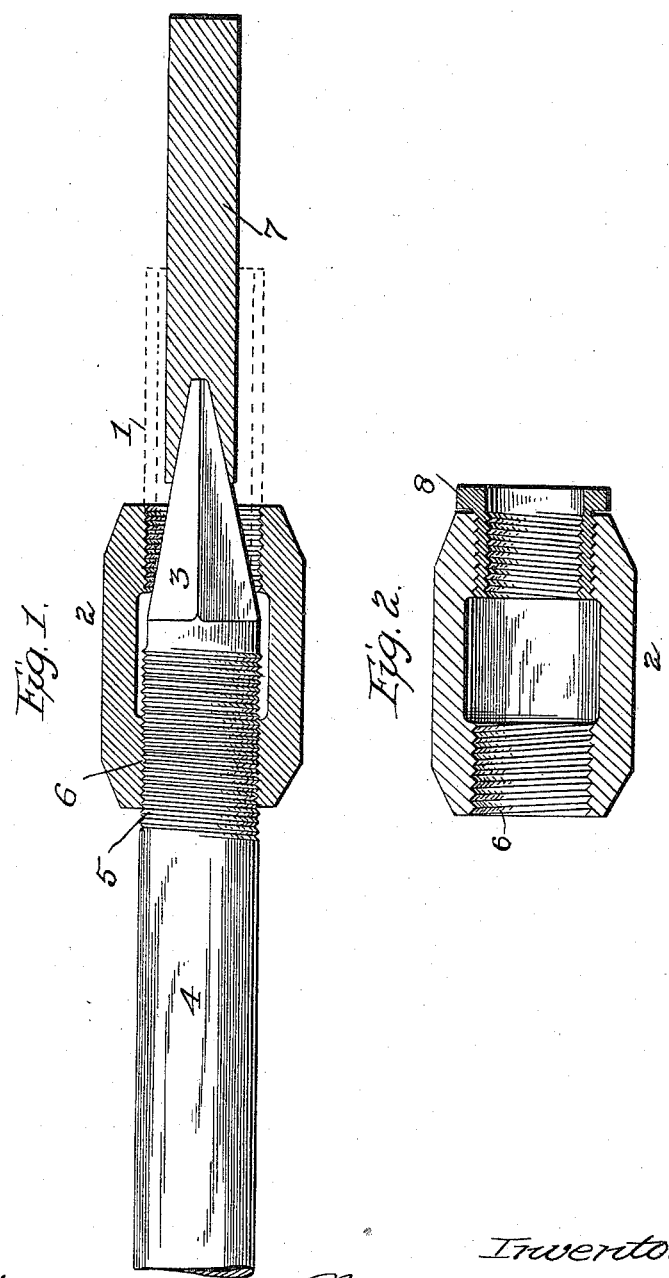

UNITED STATES PATENT OFFICE.

WILLIAM LEE, OF ALTOONA, PENNSYLVANIA, ASSIGNOR, BY DIRECT AND MESNE ASSIGNMENTS, OF FIVE-SIXTHS TO E. O. GEESEY AND C. S. MYER, OF SAME PLACE.

NIPPLE-HOLDER.

SPECIFICATION forming part of Letters Patent No. 573,013, dated December 15, 1896.

Application filed May 23, 1896. Serial No. 592,748. (No model.)

*To all whom it may concern:*

Be it known that I, WILLIAM LEE, a citizen of the United States, residing at Altoona, in the county of Blair and State of Pennsylvania, have invented certain new and useful Improvements in Nipple-Holders, of which the following is a specification, reference being had therein to the accompanying drawings.

My invention relates to threading nipples, and is designed for plumbers' use to enable them to expeditiously thread nipples of different sizes both as regards their length and their diameter.

In the accompanying drawings, Figure 1 is a central longitudinal section through the device with one part in elevation. Fig. 2 is a central sectional view of the chuck with reducing means therein.

The nipple to be threaded is shown in dotted lines at 1, and this is held by a chuck 2, engaging the threaded end thereof, which draws it in contact with a spear-head 3 of polygonal cross-section, the sharp edges of which engage the internal face of the nipple and thus form, together with the chuck, a firm grip upon the end of the nipple to hold it in place while the opposite end is being threaded. This spear-head is carried upon a bar 4, screw-threaded at 5, to be engaged by the thread 6 in the end of the chuck. The screw-threads at the opposite ends of the chuck are reversed relatively to each other, that at one end being left hand and that at the other end being right hand, so that by engaging the thread at one end with the threads of the nipple and then turning the chuck the nipple will be drawn into place and into contact with the rectangular spear-head, the sharp corners of which will hold the nipple firmly while the nipple is being threaded. An ordinary threading-tool is used, having the threading-cutter at one end and the guiding-bushing at the other end, the guiding-bushing being slipped on the nipple in advance of the cutter to guide the threading-tool in its operation. The operation of threading with such a tool may be readily carried out. With long nipples or with short nipples in which their length approximates the width of the threading-tool additional means must be provided so that the threading-tool will be accurately guided and maintained in its threading action. For this purpose I provide a supplemental guide 7, consisting of a bar having a rectangular tapered socket at its end adapted to fit accurately upon the end of the spear-point 3 to extend axially therefrom. This is applied to the spear-head when a short nipple is used, and the end of the guide-bar projects beyond the end of the nipple and the cutting-tool is placed upon this guide with its cutter in advance of the guiding-bushing on the tool, the said bushing being adapted to fit accurately upon the supplemental guide-bar. This bushing will thus guide and maintain the tool in proper position for the cutting action.

In Fig. 2 I show a reducer, consisting of a hollow sleeve threaded externally to engage the threads in one end of the chuck and having internal threads running in the same direction as the internal threads of the chuck, so that it practically forms a chuck end of a reduced diameter. This reducer 8 has a flange fitting upon the end of the chuck. The nipple is simply placed inside this reducer and the operation is carried on in precisely the same way as above described. This nipple-chuck is intended to hold a short or long nipple, as the case may be, to thread a left-handed thread on a right-handed thread-nipple by forcing a four-cornered spear on the inside of said nipple to act as a chuck. The nipple, by the action of the screwing up of the socket, will be drawn up on the four-cornered spear so that it will chuck it on the spear securely against turning either way, and in taking out short nipples where ordinarily it is necessary to use tongs or a wrench, and thus injure the thread, I avoid all of this objectionable action, for by putting the tongs or wrench on the end of the chuck that holds the spear it is easy to take out the nipple, and in the same way it is easy to put in a short nipple when there is not enough room to work a pair of tongs or wrench. To cut a left-handed thread as it is done now, it is necessary to use a lathe with a chaser for making threads; but with this device it is possible to cut either right or left handed threads on a short or what is called a "shoulder" nipple with a common set of ordinary plumber stocks and die, as this chuck will hold the nipple in any pipe-vise so that it cannot turn.

I claim as my invention—

1. In combination in a chuck, the threaded support, the sleeve having right and left hand threads at its opposite ends and a supplemental guide detachably connected with the support, substantially as described.

2. In combination, the sleeve, the support 4, threaded into the same and having a tapered end and a supplemental support detachably connected thereto.

In testimony whereof I affix my signature in presence of two witnesses.

WILLIAM LEE.

Witnesses:
J. D. BURLEIGH,
E. O. GEESEY.